April 12, 1938.  E. T. CONDON  2,113,829
AUTOCOLLIMATING SIGNAL DEVICE
Filed Aug. 7, 1934  2 Sheets—Sheet 1

INVENTOR.
EDWARD T. CONDON
BY
ATTORNEY.

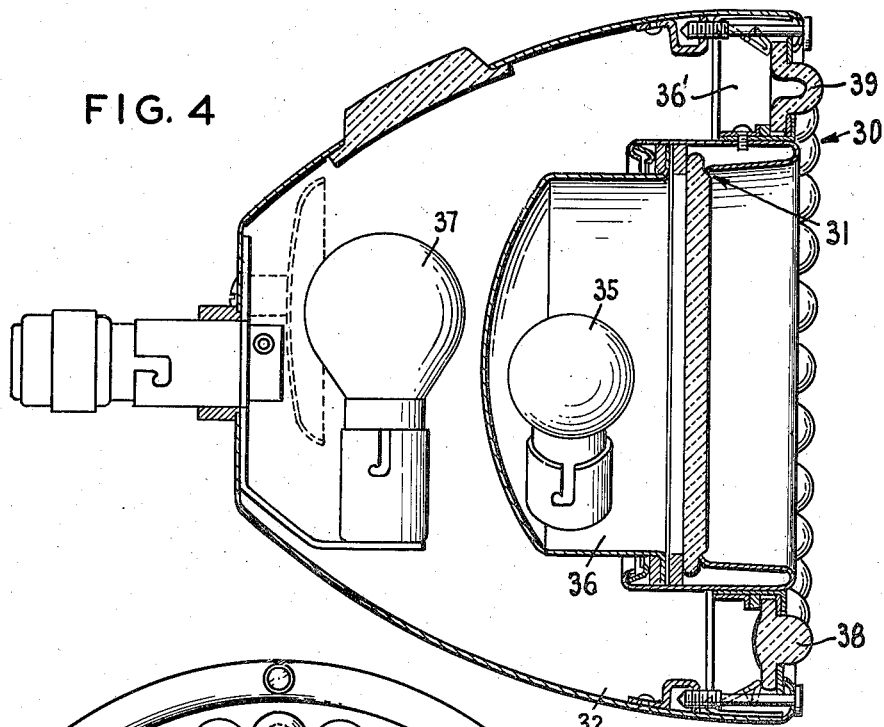
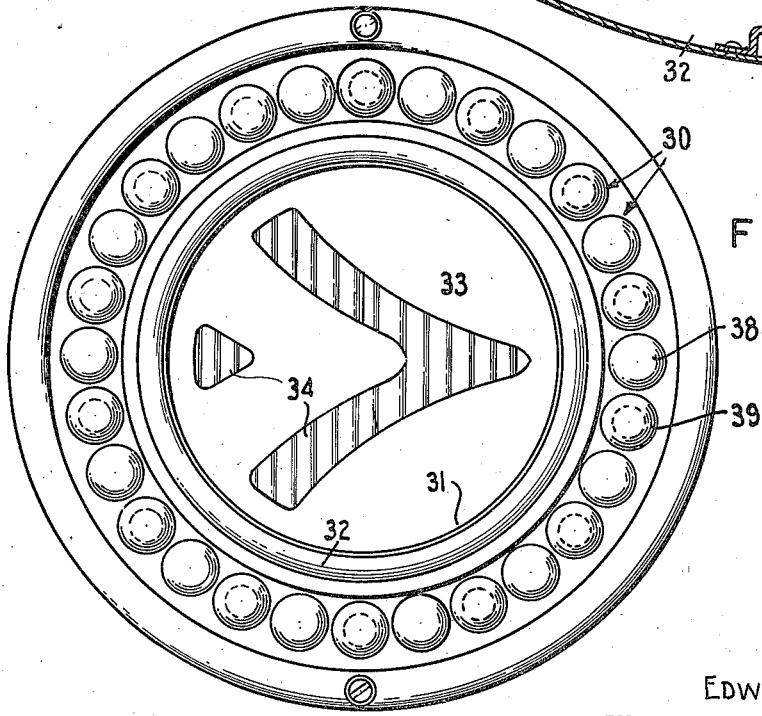

Patented Apr. 12, 1938

2,113,829

UNITED STATES PATENT OFFICE 2,113,829

AUTOCOLLIMATING SIGNAL DEVICE

Edward T. Condon, New York, N. Y.

Application August 7, 1934, Serial No. 738,805

2 Claims. (Cl. 88—82)

The invention relates to signal lamps embodying autocollimating reflector units, and more especially to signal lamps of this nature adaptable for use with automobiles.

Autocollimating reflectors, comprising a multiplicity of integrally associated units consisting of spherically formed portions of transparent material combined into an object lens and a collimating lens, the latter being faced with a coating of silver for reflecting oncoming light rays, are well known; and it is an object of the present invention to combine such units with integrally associated elements adapted for the transmission of light rays as signals under manual control.

A further object of the invention resides in the provision of a one-piece or cast glass member adapted to receive and reflect oncoming rays of light as well as to serve for the transmission of light rays through the member and under the control of signalling instrumentalities as provided on automobiles.

In carrying out the invention, a signal member is provided of a transparent block of glass constituted of a multiplicity of autocollimating units grouped to present the desired design of field, but with certain of the units having their collimating lens portions omitted as well as the reflecting surfaces thereof. These elements comprising only the object lenses are, moreover, recessed or undercut so as not only to render the same more transparent but also to afford a lateral transmission of light rays to the adjacently disposed complete autocollimating units.

The nature of the invention, however, will best be understood when described in connection with the accompanying drawings, in which:

Fig. 4 is a longitudinal section of a lamp housing with a signal lens member, and illustrates a further modification in the lens pattern as well as in the signal lamp as a whole.

Fig. 5 is a front elevation thereof.

Figure 1:
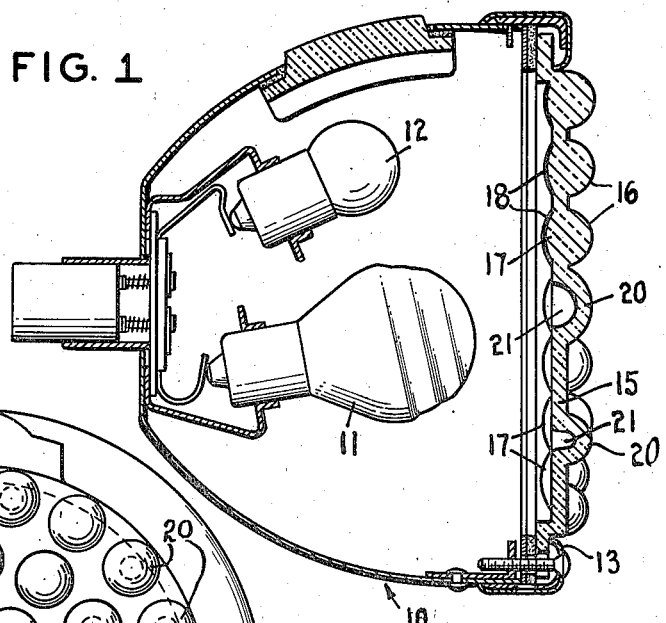
Fig. 1 is a longitudinal section through a lamp housing equipped with the novel signal lens member.

Referring to the drawings, 10 designates a metal casing of suitable shape and designed to house one or more lamps as the lamps 11 and 12, the latter being designed for use as a tail and parking light and the former as a stop light, both being operated in the usual manner by instrumentalities (not shown) with which a motor car is generally equipped. The front of the casing 10 is designed as usual to be closed by a transparent member as of glass and held within a suitable cap or ring 13.

This lens member is constructed, in accordance with the present invention, of an integral or cast glass block or plate 15 having the outer lenses or protuberances 16 of a more or less spherical form and constituting the object lenses of autocollimating units, the collimating lens portions 17 associated therewith being also of more or less spherical shape and usually of a larger radius than the radius of the object lens, the two portions of a unit contacting along a diametral plane. The rear surface of each of these collimating lenses 17, furthermore, is faced in well known manner with a coating of silver, and preferably also with a coating of varnish thereover, as indicated at 18.

Contrary to the usual practice, however, in constructing a lens member of this nature, the present signal member is not constructed wholly of such autocollimating units adjacently disposed; but a number of the object lenses of the group are not associated with collimating lens portions nor with a reflecting coating; and, preferably, so far as the design of the signal field will allow, alternate units only are of the collimating type and adapted for reflection.

Thus, it will be noted that the protuberances or object lenses 20 are without associated collimating lenses as in the case of the object lenses 16; and, furthermore, that the said lenses 20 are recessed as at 21 at the inner portion. This will permit light rays from the lamps 11 and/or 12 to pass through these particular lenses, the said rays being blocked by the silvered portion 18 of the collimating lenses 17 which are designed merely to reflect any oncoming light rays directed upon the signal field or plate 15. Furthermore, the object lenses all being grouped adjacently and substantially in a common plane, light rays from lenses 20, which are interspersed with the reflecting units, will be directed and reflected laterally from the recess walls of the said lenses 20 to the adjacently disposed lens portions 16, serving thus to illuminate these lenses as well as the said lenses 20 when a lamp 11 and/or lamp 12 is energized.

Figure 2:
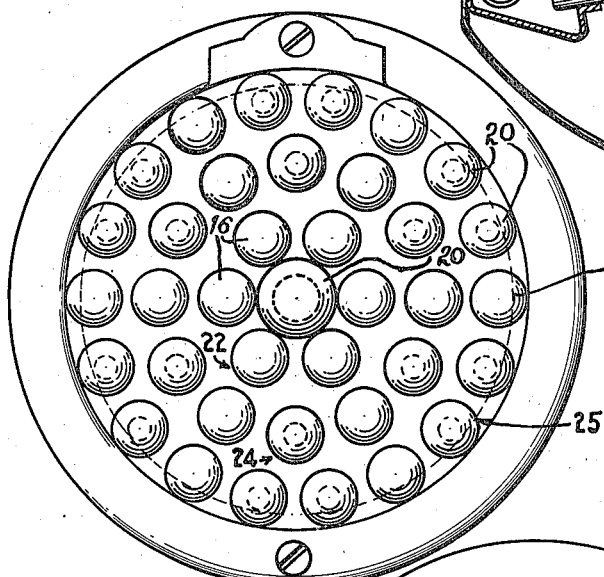
Fig. 2 is a front elevation thereof.

Various patterns of this combined autocollimating and signalling lens member are possible in the arrangement of the different object lenses 16 and 20. Thus, as indicated in Fig. 2, wherein a circular signal lens is set forth, a single light-transmitting lens 20 is centrally disposed, and in the present instance is made of somewhat larger diameter than the remaining lenses which are grouped around the same in concentric rows.

For example, the first row 22 is constituted solely of the object lenses 16 of the type associated with a collimating lens to afford a reflecting unit; while the succeeding rows include both types of lenses—the row 24 immediately adjacent the aforesaid row 22 comprising alternate lens units of the two types, and the next succeeding row 25 comprising single lens units 16 alternating with pairs of adjacent lenses 20.

Figure 3:
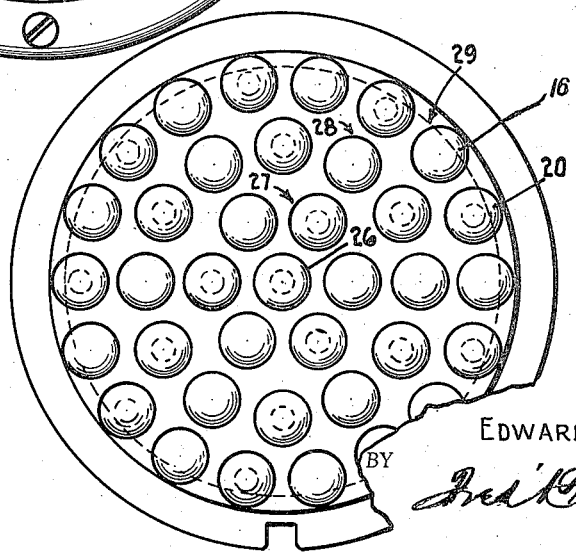
Fig. 3 is a front elevation of a signal lamp illustrating a modified pattern of the signal lens member.

In Fig. 3 a further modification is found in which the centrally disposed lens 26 is of the type of the lens 20 of the previously described embodiments, and the succeeding rows 27, 28, 29 concentric therewith comprise alternately arranged lenses respectively of the type of lenses 16 and 20 of said embodiment. Of course, various other combinations are possible, and I do not desire to be limited to the particular arrangements set forth.

A further modification in the arrangement of the lenses and signal device is set forth in the embodiment shown in Figs. 4 and 5, in which the two types of lenses are arranged alternately in a single ring 30 and about a separate central signal field portion 31. Thus, this central portion closing part of the front of the main lamp housing 32 comprises an opaque field 33 with signal portion 34, as of fluted glass, and through which light is directed from a lamp 35 mounted within an auxiliary housing 36 located coaxially within the main housing 32.

An annular light chamber 36' surrounds this auxiliary housing and is closed at the front by the annulus 30, illumination for said annulus being had from a lamp 37 at the rear of housing 32. The annulus 30, furthermore, may be concentric with the signal portion 34 and field 33; and, as in the previously described embodiment, the autocollimating reflecting units 38 thereof will be illuminated by oncoming rays of light directed thereto; while the object lens portions 39, unassociated with collimating portions and alternating with the lenses 38, will transmit light received from the lamp 37 which may be of the type embodying a double filament and serving thus as both a tail and stop light. It will be appreciated that, similarly to the previously described embodiments, light from a lens 39 will be caused also to effect illumination of contiguous autocollimating units 38.

I claim:

1. A lens member for automobile signal lamps, comprising a group of autocollimating reflector units for reflecting light rays incident thereon substantially in the direction of incidence and embodying lens portions projecting from the outer face of the member, and a plurality of light-transmitting object lens units, disposed adjacent the said reflector units, recessed axially outwardly at the back to an extent to refract light from a source behind the lens member onto the projecting lens portions of the autocollimating units.

2. A lens member for automobile signal lamps, comprising a block of cast glass formed with a plurality of adjacently disposed and integral autocollimating units, each consisting of a hemispherical object lens projecting from the outer face of the member and a reflector lens of substantially spherical curvature, united along the diametral plane of the former and projecting inwardly from said face, to reflect substantially in the direction of incidence light rays incident upon the said units, and a plurality of integral, light-transmitting and substantially hemispherical object lens portions interspersed with the said autocollimating units and recessed axially outwardly at the back to an extent to refract light from a source behind the lens member onto the projecting lens portions of the autocollimating units.

EDWARD T. CONDON.